United States Patent
Kishimoto

[11] Patent Number: 6,129,580
[45] Date of Patent: Oct. 10, 2000

[54] FLAT BICYCLE CABLE CONNECTOR

[75] Inventor: Hitoshi Kishimoto, Sakai, Japan

[73] Assignee: Shimano, Inc., Sakai, Japan

[21] Appl. No.: 09/098,369

[22] Filed: Jun. 17, 1998

[30] Foreign Application Priority Data

Jun. 24, 1997 [JP] Japan ................................ 9-183130

[51] Int. Cl.⁷ .......................... H01R 12/24; H01R 1/01
[52] U.S. Cl. .......................................... 439/496; 439/544
[58] Field of Search ................................. 439/496, 544, 439/492, 495, 76, 67; 339/176; 74/502.2; 280/288.4

[56] References Cited

U.S. PATENT DOCUMENTS

| | | |
|---|---|---|
| 3,114,587 | 12/1963 | Herrmann . |
| 3,141,720 | 7/1964 | Johnson . |
| 4,071,892 | 1/1978 | Genzling ................................ 364/424 |
| 4,373,766 | 2/1983 | Johnston ............................ 339/91 R |
| 4,479,693 | 10/1984 | Uyeda et al. . |
| 4,770,645 | 9/1988 | Antes . |
| 4,859,984 | 8/1989 | Romano ................................ 340/432 |
| 5,049,090 | 9/1991 | Johnson . |
| 5,241,878 | 9/1993 | Nagano .............................. 74/502.2 |
| 5,370,412 | 12/1994 | Ming-Fu Chou ..................... 280/288.4 |
| 5,702,269 | 12/1997 | Uchida et al. .......................... 439/496 |

FOREIGN PATENT DOCUMENTS

| | | |
|---|---|---|
| 0639 459 A2 | 7/1994 | European Pat. Off. . |
| 7-277265A | 10/1995 | Japan . |

*Primary Examiner*—Lincoln Donovan
*Assistant Examiner*—Chandrika Prasad
*Attorney, Agent, or Firm*—Knobbe, Martens, Olson & Bear LLP

[57] ABSTRACT

An electrical cable connector for bicycles that has a simple structure, low cost, and excellent shielding against shocks, moisture, and the like is disclosed. The connector includes a connector body which has a top surface and a bottom surface, and has a slit which forms a passageway between the top and bottom surfaces. The top surface includes an inclined portion which extends from the slit to a flat terminal section. A flat cable extends along the bottom surface, through the slit, and along the top surface such that a terminal at the end of the flat cable is positioned on the flat terminal section. In a disclosed application, the connector plugs into a female connector of a switch unit of a bicycle lever bracket.

21 Claims, 6 Drawing Sheets

FLAT BICYCLE CABLE CONNECTOR

BACKGROUND OF THE INVENTION

1. Field of the Invention

The present invention relates to a flat bicycle cable connector for forming connections with the signal wires from sensors or switches, and, more particularly, to a flat bicycle cable connector for forming connections with the bicycle switches disposed on a lever bracket designed to hold a brake lever and fixed to the bicycle handlebar.

2. Description of the Related Art

Bicycles are often equipped with displays for displaying the bicycle speed, the distance traveled, the shifter position, and various other types of information. Displays capable of displaying such a large volume of information are equipped with switches for switching among the types of parameters displayed or for indicating the start of measurement. In addition, displays are often detachably mounted on bicycles, and display switches are often integrated with the displays. There are also switches that are disposed on lever brackets (brackets that are designed to hold brake levers and that are fixed to the bicycle handlebar) to achieve better operability (U.S. Pat. No. 4,071,892). Connectors for connecting the signal wires from sensors (such as those for sensing the shifting position of the shift lever section) with the circuit substrates provided with these switches are used to allow the shifting position to be viewed on a display.

Existing connectors for connecting the signal wires from various sensors with circuit substrates tend to develop faulty contacts and other defects as a result of vibration. Another drawback is the failure to properly seal such connectors against water or the like, making it easier for the connection terminals to become corroded or otherwise affected. Still another drawback is that conventional connectors have complex structures, high cost, and low impact resistance against vibration or the like.

SUMMARY OF THE INVENTION

In view of these deficiencies, an object of the present invention is to provide a bicycle connector for a flat cable that has a simple structure, low cost, and excellent protection against shocks, moisture, and the like.

In accordance with the invention, a flat bicycle cable connector is thus provided which comprises a connector body which has a bottom surface, a top surface that includes a terminal surface, and a tip surface. The connector body has a slit formed therein for allowing a flat cable to pass between the top and bottom surfaces without extending along the tip surface. A flat cable comprising a plurality of signal wires arranged in parallel extends along the bottom surface, through the slit, and along the top surface such that a terminal of the cable is positioned on the terminal surface.

The connector body is preferably provided with an inclined section that is shaped as a continuation of the flat section at the tip. Furthermore, the connector body is preferably formed from an elastic material such as rubber. Additionally, the section corresponding to the slit is preferably sealed with a packing material when the flat cable has been inserted. In a preferred application for the connector, the connector is received by a female connector of a switch unit that is mounted on a bicycle lever bracket.

BRIEF DESCRIPTION OF THE DRAWINGS

These and other features of the invention will now be described with reference to the drawings of a preferred embodiment, which is intended to illustrate but not limit the scope of the invention, and in which:

FIG. 4 is a detail drawing depicting the lower switch case, where

FIG. 5 is a diagram depicting a printed substrate, where

DETAILED DESCRIPTION OF THE PREFERRED EMBODIMENT

Figure 1:
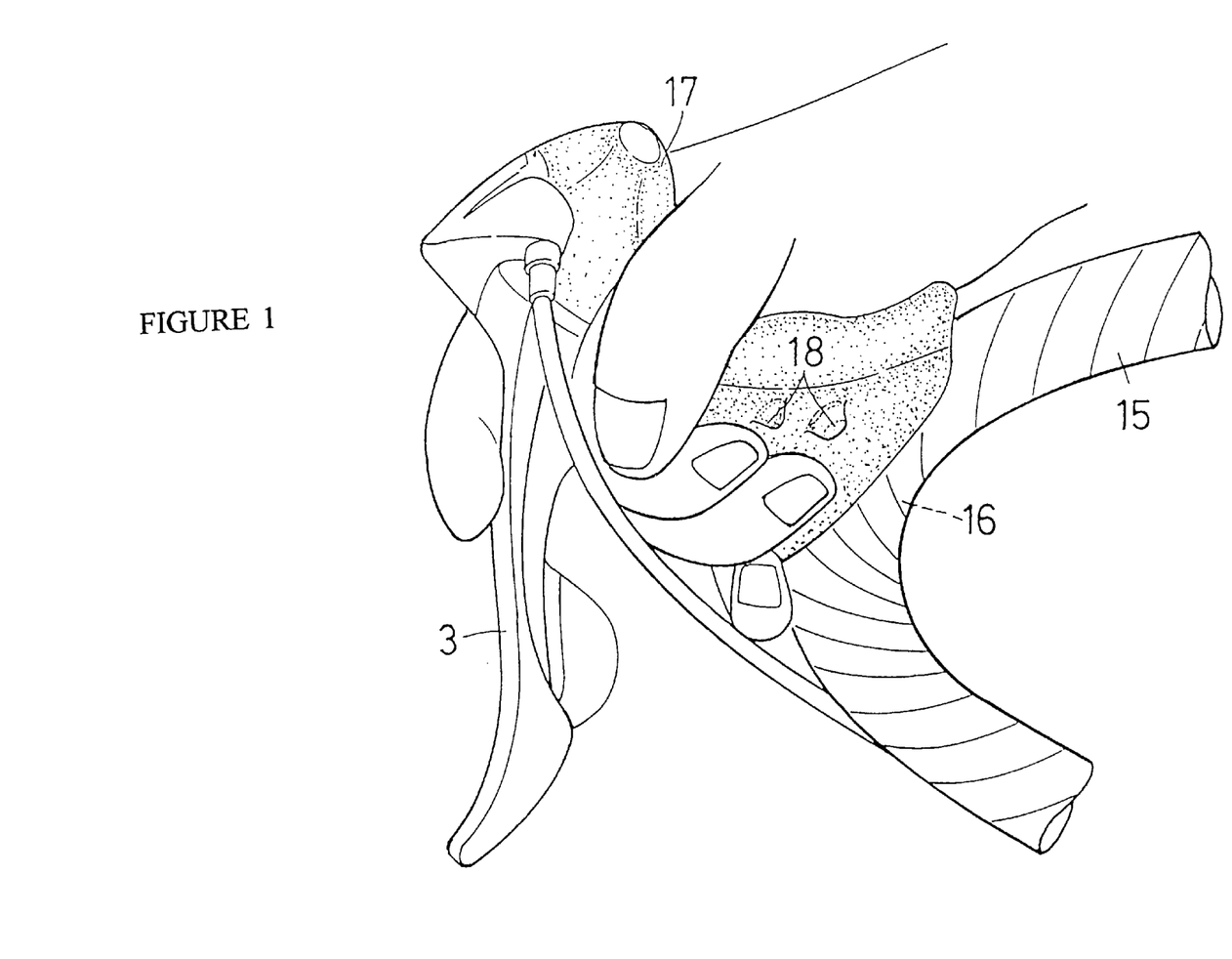
FIG. 1 is a diagram depicting the lever bracket used for the flat bicycle cable connector of the present invention.

A preferred embodiment of the present invention will now be described with reference to drawings. FIG. 1 is a diagram depicting the lever bracket used for the flat bicycle cable connector of the present invention. The lever bracket, which is designed for mounting a control lever 3 capable of performing braking and shifting operations, is fixed with the aid of a fixing band 16 to a bicycle handlebar 15. The lever bracket, which is provided with switches for turning on the display, switching the display modes, and the like, is operated by means of push-button protrusions 18.

Figure 2:
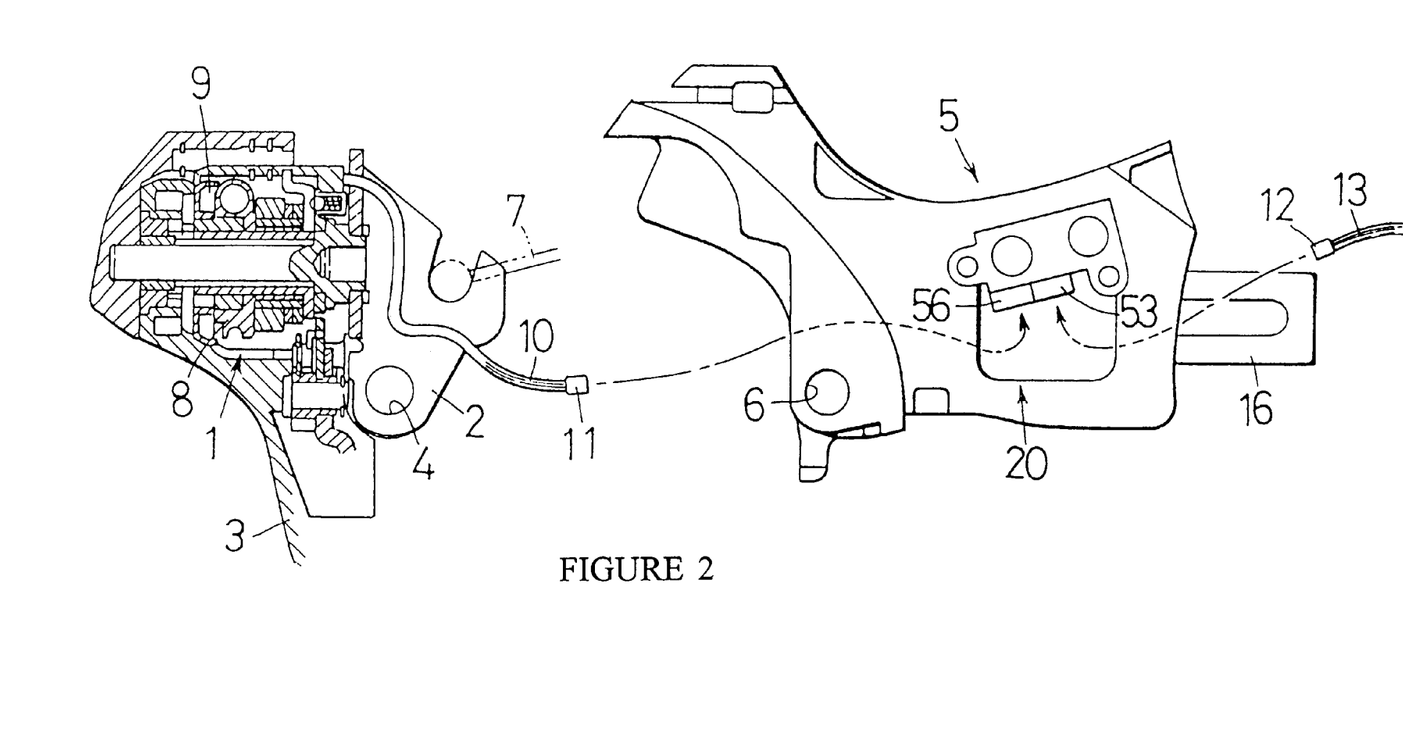
FIG. 2 is an exploded view of a shifter and a lever bracket.

FIG. 2 is an exploded view of a shifter 1 and a lever bracket 5. The shifter 1, which is mounted on a rocker body 2, can be used to perform braking and shifting with the aid of the same control lever 3. The rocker body 2 is hingedly mounted on the lever bracket 5 with the aid of a spindle bore 4 in the rocker body and with the aid of a rockshaft (not shown) that passes through the spindle bore 6 of the lever bracket 5. In addition, one end of a brake cable 7 is connected to the rocker body 2. Furthermore, one end of a derailleur wire (not shown) for actuating the rear derailleur (not shown) of the chain-shifting mechanism is connected to the winding drum 8 of the shifter 1.

To brake, the rider grips the control lever 3 and swings the rocker body 2 together with the shifter 1 about the rockshaft, pulling the brake cable 7 and actuating the front brake. To shift, the rider turns the control lever 3 about an axis of rotation orthogonal to the rockshaft, rotatably actuating the winding drum 8, pulling the derailleur wire, and executing a shift. Consequently, braking is performed by swinging the rocker body 2 with the aid of the control lever 3, whereas shifting is performed by turning the winding drum 8 with the aid of the control lever 3. The shifter 1 has a conventional structure (see, for example, Japanese Laid-Open Patent Application 2-225191) and will not be described in detail herein because it falls outside the scope of the present invention.

The shifter 1 is fitted with a position sensor 9 for sensing the position of the winding drum 8. The position sensor 9 electrically senses the angle of the winding drum 8 with the aid of a physical contact. The shifting position of the derailleur can thus be sensed by sensing the angle of the winding drum 8. The angle-sensing structure will not be described in detail herein because it falls outside the scope of the present invention.

One end of a flat cable 10 having a plurality of signal wires is connected to the position sensor 9. The other end of the flat cable 10 is fashioned as a male connector 11. The flat cable 10 is passed through the lever bracket 5 and connected by means of the male connector 11 (located on the tip of the cable) with a female connector 56 (FIG. 5), which is a terminal provided to a printed substrate 32, as described above. A male connector 12 is further connected to the female connector 53 of the printed substrate 32 (FIG. 3), and a five-conductor cord 13 connected thereto is also connected to the display.

Figure 3:
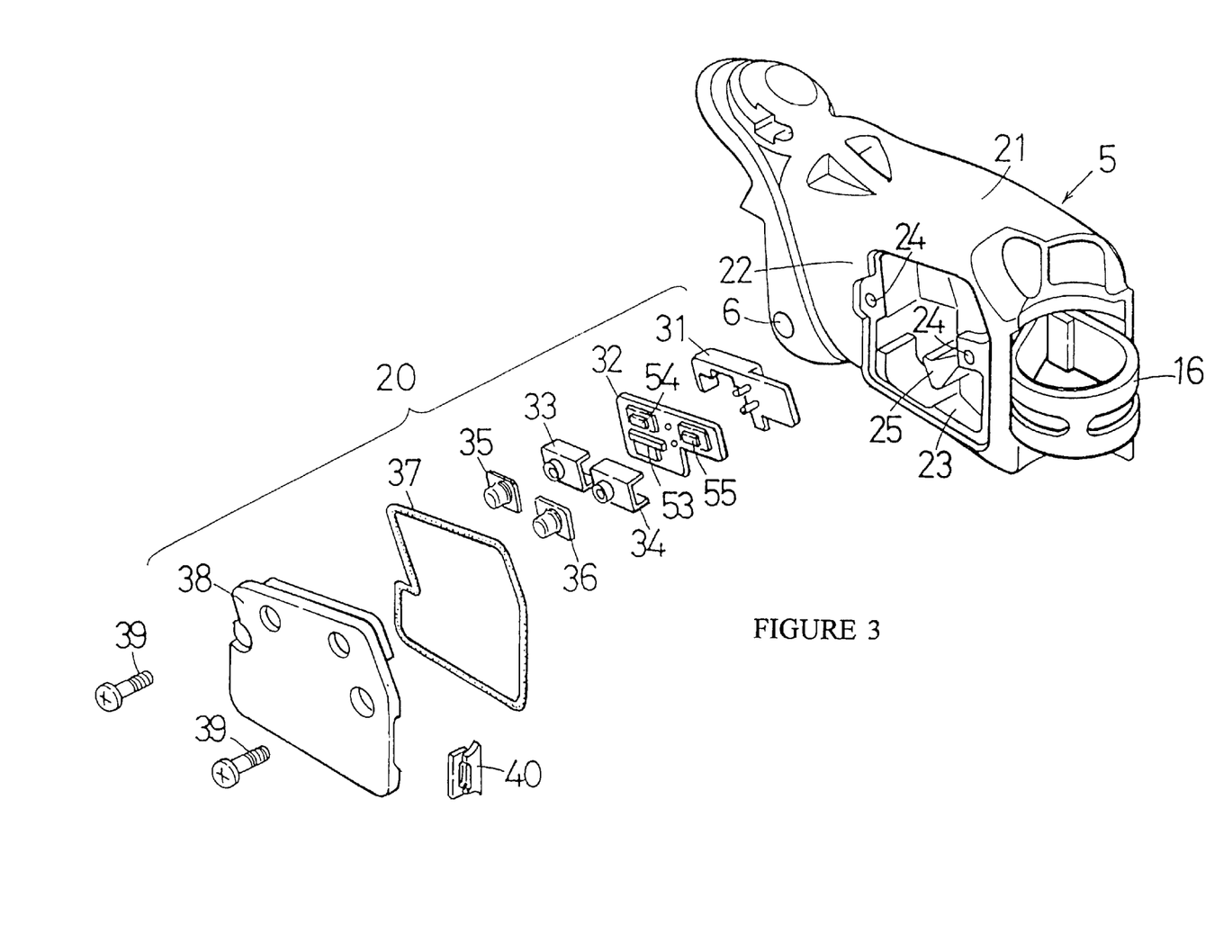
FIG. 3 is an exploded detail view of a unit switch.

FIG. 3 is a three-dimensional exploded detail view of a unit switch 20 and a lever bracket 5. The lever bracket 5, which is used to mount the control lever 3 for front braking and shifting, is fixed to a handlebar 15 (FIG. 1) with a fixing band 16. A depression is formed on the inside of the lever bracket 5; that is, on the side facing the central reference plane of the bicycle, and the unit switch 20 is positioned in this depression.

The push buttons 35 and 36 of the unit switch 20 are mounted at positions not readily reachable by the thumb; that is, at positions that do not create any obstacles, when the rider squeezes the control lever 3 to perform braking. In other words, the push buttons 35 and 36 are mounted at positions that are different from the normal positions of the fingers on the grip on the side facing the central reference plane of the bicycle in order to prevent accidental switching.

The grip 21 in the center of the lever bracket 5 is roughly rectangular in cross section, and the corner portions thereof are rounded. Surface 22, which faces the central plane of the bicycle, is provided with a unit switch mounting depression 23 for inserting and securing the unitized unit switch 20. Viewed from the front, the unit switch mounting depression 23 has a modified rectangular shape. Two screw holes 24 for fixing an upper switch cover 38 are provided at two positions at the front and back of the unit switch mounting depression 23. In addition, a positioning stopper surface 25 for forming a connection with the printed substrate 32 described below is formed in the center of the unit switch mounting depression 23.

The unit switch 20 comprises a lower switch case 31, a printed substrate 32, push-button guide members 33 and 34, push buttons 35 and 36, a gasket or sealing member 37, an upper switch cover 38, and small screws 39. The lower switch case 31 is used to fix and hold the printed substrate 32. The printed substrate 32 is used to position connectors and other components for connecting the switches and cables for the push buttons 35 and 36.

The push button 35 is used to depress and to turn on and off the start switch 54 fixed to the printed substrate 32. The push-button guide member 33 is used to guide the push button 35, ensuring that the start switch 54 is operated as intended. The upper switch cover 38 and the lower switch case 31 are integrally fixed by ultrasonic welding following assembly. The gasket 37 is used to seal the gap between the lever bracket 5 and the upper switch cover 38.

The entire outside surface of the lever bracket 5 is covered with a synthetic-resin bracket cover 17 (see FIG. 1). The bracket cover 17 is provided with two push-button protrusions 18. The push buttons 35 and 36 located in the lever bracket 5 are positioned underneath these push-button protrusions 18. Depressing the push-button protrusions 18 elastically deforms the bracket cover 17, pushes the push buttons 35 and 36, and results in actuation of a respective switch 54, 55.

The two push-button protrusions 18 differ in height and shape. Using differences in height, shape, and other configuration enables the user to determine by touch, without employing the visual sense, which of the push-button protrusions 18 is in contact with the thumb. This feature thus helps to prevent accidental switching. The push buttons 35 and 36 are constructed with different heights and shapes to match the two push-button protrusions 18.

Figure 4A:
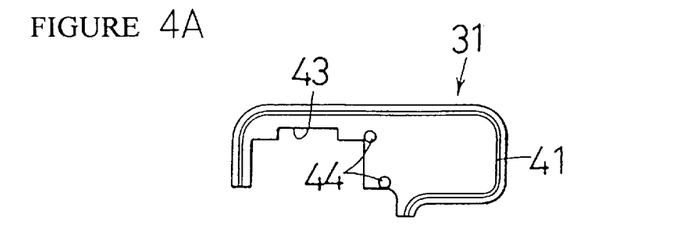
FIG. 4a is a front view and FIG. 4b is a top view.
Figure 4B:
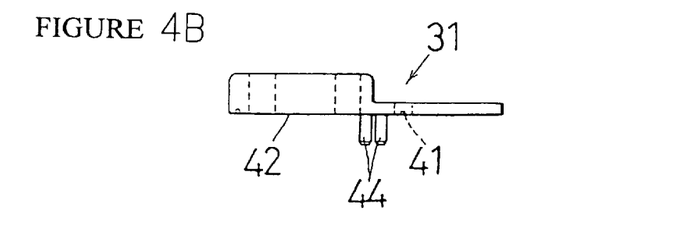

FIG. 4 is a detail drawing depicting the lower switch case 31. FIG. 4a is a front view, and FIG. 4b is a top view. The lower switch case 31 is roughly shaped as a flat rectangle, and a groove 41 is formed around the outside of the front surface 42 thereof. The protrusion on the upper switch cover 38 is inserted into the groove 41, and the two are then integrated by ultrasonic welding. The lower switch case 31 is provided with a notch 43. The notch 43 is used to house the female connector 56 (FIG. 5b) mounted on the printed substrate 32. Two positioning pins 44 are formed on the front surface 42 of the lower switch case 31. The positioning pins 44 are used to position the printed substrate 32 in the lower switch case 31.

Figure 5A:
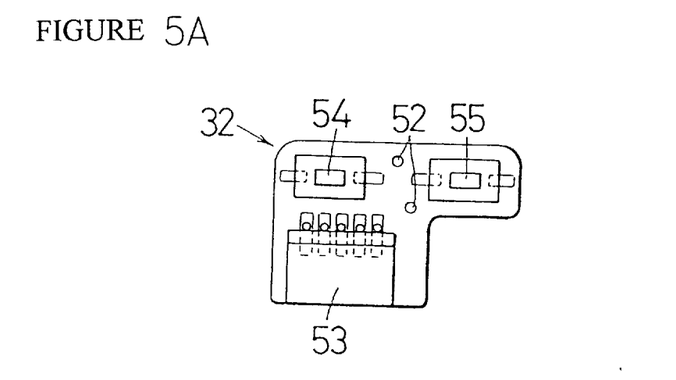
FIG. 5a is a front view and FIG. 5b is a back side view.
Figure 5B:
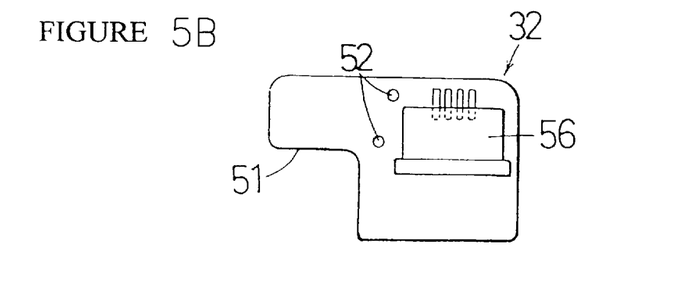

FIG. 5 is a diagram depicting the printed substrate 32. FIG. 5a is a front view, and FIG. 5b is a back view. The printed substrate 32 is shaped as a plate, and electric circuits are formed on its surface by conventional methods. The printed substrate 32 has a roughly rectangular outside shape, and a notch 51 is formed in one of its corner portions. Positioning holes 52 are formed at two positions in the center of the printed substrate 32. The positioning pins 44 of the lower switch case 31 are inserted into these positioning holes 52 to position the printed substrate 32 in the lower switch case 31. The female connector 53 is fixed by soldering to the front surface of the printed substrate 32. The female connector 53 provides electrical conductivity for the wiring pattern formed from a copper foil or other conductor on the printed substrate 32.

The male connector 11 of the flat cable 10 leading from the position sensor 9 is inserted into the female connector 56. In addition, a mode switch 55 and a start switch 54 for a display (not shown) are fixedly mounted on the front surface of the printed substrate 32. The start switch 54 is used to control the initiation and termination of measurement for the lap time or the distance traveled by the bicycle. The start switch 54 and the mode switch 55 are conventional switches fixed by soldering to the printed substrate. These switches are turned on and off by being pressed at the top, and are provided with a conventional structure in which built-in springs return the switches to their original operating positions once the top portion has been depressed and released with a finger.

The mode switch 55 is used to select the display mode of the display, that is, to select the parameter type or the display routine. Examples of display modes include a speed display mode for indicating the traveling speed, a travel distance display mode for indicating the distance traveled, and a travel time display mode for indicating the travel time. These types of bicycle computer functions are known in the art and will not be described in detail herein because they fall outside the scope of the present invention.

Figure 6:
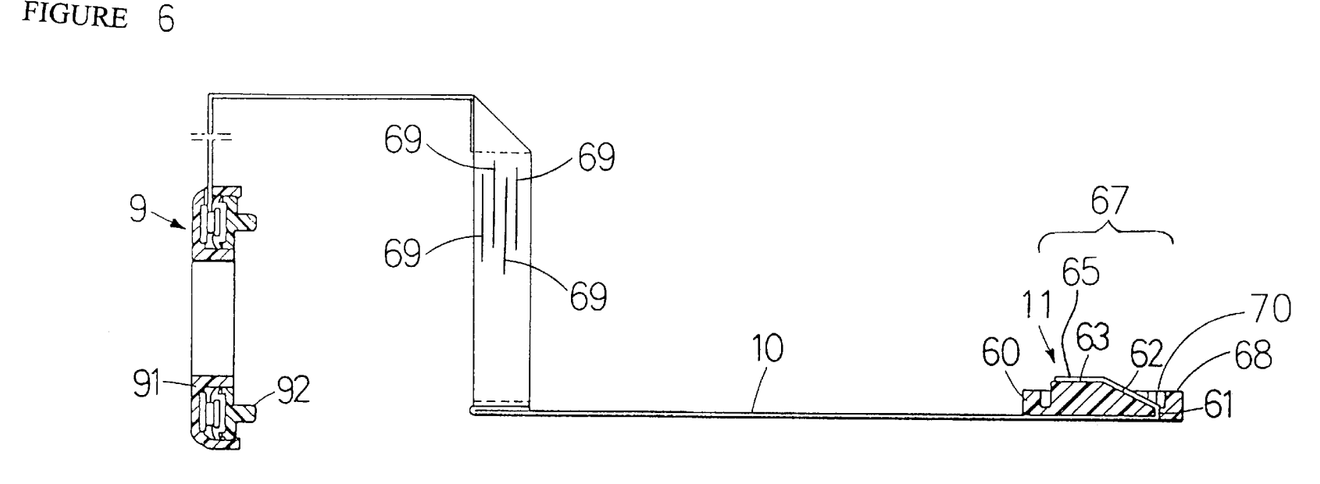
FIG. 6 is an enlarged detail cross-sectional view depicting the structure of a position sensor, flat cable, and male connector.
Figure 7:
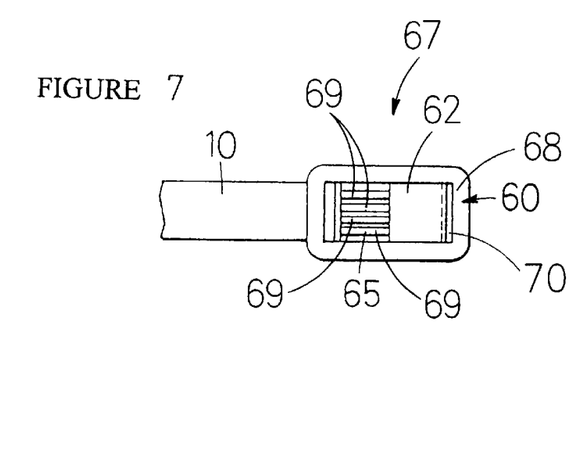
FIG. 7 is a top view of the male connector.
Figure 8:
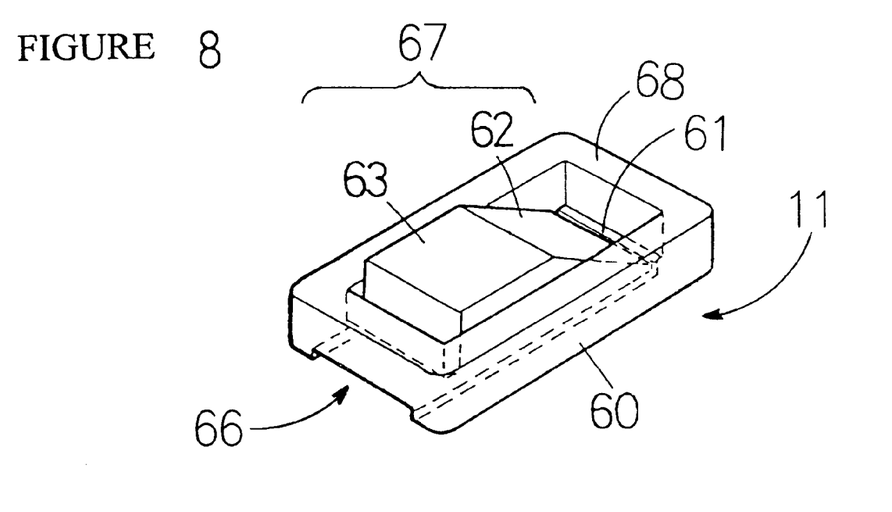
FIG. 8 is an oblique view depicting the structure of a connector body.

FIG. 6 is an enlarged detail cross-sectional view depicting the structure of the position sensor 9, flat cable 10, and male connector 11. FIG. 7 is a top view of the male connector 11, and FIG. 8 is an oblique view depicting the structure of a connector body 60. Throughout the description of the male connector 11, the terms "top" and "bottom" are used for convenience of description only, and are not intended to imply a particular orientation for using the connector.

The fixed component 91 of the position sensor 9 is fixed to the shifter 1 (FIG. 2). The rotary component 92 of the position sensor 9 is fixed to the winding drum 8 and is rotated together with this winding drum. The shifting position of the rear derailleur, that is, the rotary position of the winding drum 8, can be sensed based on the relative positions of the fixed component 91 and rotary component 92. A voltage signal corresponding to the shifting position is outputted as a sensing signal for the shifting position on the rear side, and an on/off signal is outputted on the front side.

The flat cable 10 is a four-conductor cable having four signal wires or conductive lines 69. One end of the cable is connected to the position sensor 9, and the other end of the cable is fashioned as a terminal for the male connector 11. Specifically, the other end of the flat cable 10 passes from a bottom side, a bottom surface or a lower surface 66 of a connector body 60 (i.e., the lower surface 66 in FIG. 6) to a top side, a top surface or an upper surface 67 that faces a terminal 65 (i.e., the upper surface 67 in FIG. 6) through a slit 61 formed near a tip 68 of the connector body 60. In addition, the end portion of the flat cable 10 is folded backward along an inclined section 62 and a flat terminal section 63 of the connector body 60. After the flat cable 10 is inserted, the recession formed at the front end of the inclined section 62 is packed with a packing material 70 to seal the gap formed by the slit 61 that goes around the flat cable 10.

A terminal 65 connected to or formed by the signal wires 69 is mounted on the upper surface 67 at the end of the flat cable 10 thus installed. The terminal 65 is mounted on the flat terminal section 63 of the upper surface 67 in the illustrated connector 11. The terminal 65 is preferably formed from a metal thin film or other material patterned on one or both surfaces at the end of the flat cable 10. The connector body 60 is preferably formed from rubber or another elastic material. The inclined section 62 of the connector body 60 is shaped such that it is thin in its front portion and thick in its back portion, and a slit 61, which is capable of accommodating the flat cable 10, is preferably formed in the front end of the inclined section 62. The illustrated flat terminal section 63, which has a constant thickness, is connected to the inclined section 62. This flat surface 63 is preferably parallel to the bottom surface 66 of the connector body 60. As best seen in FIG. 8 (primarily in dashed lines), that bottom surface 66 of the connector body 60 has a channel or depression extending longitudinally therealong for receiving the flat cable 10. This channel has a width which is sized to match the width of the flat cable 10.

The male connector 11 is inserted into the female connector 56 shown in FIG. 2, connecting the terminal 65 of the male connector 11 with the terminal formed on the inner surface of the female connector 56. The male connector 11 can thus be provided with a simple structure at a low cost. In addition, the space between the female connector 56 and the male connector 11 is sealed without any gaps being left because the connector body 60 is formed from rubber or another such elastic material. As a result, water and other types of extraneous matter are prevented from penetrating into the connection terminals, resulting in very few faulty connections.

In addition, the terminal 65 is pressed against the terminal of the female connector 56 by the elasticity of the connector body 60, reducing the incidence of faulty connections, noise, or the like to a very low level even when the bicycle is subjected to violent vibration or shocks.

Although the present embodiment has been described with reference to a case in which the entire connector body is made from rubber, it is also possible to use a soft synthetic resin other than rubber, as well as an elastomer or other elastic material, or to adopt an approach in which, for example, the surface of a body made from a hard material is covered with an elastic material.

Due to its structure, the preferred embodiment provides at least the following benefits:

The costs can be kept low because the male connector 11 has a simple structure, and only a small number of parts are needed to construct the male connector.

The male and female connectors 11, 56 can be smoothly connected because the top surface 67 of the connector body 60 is provided with an inclined section 62 that is shaped as a continuation of the flat terminal surface 63 at the top. This inclined section 62 extends upward from the slit 61 to the flat terminal surface 63, so that the height or thickness of the connector body 60 is thicker at the flat terminal surface 63 than it is near the slit 61.

The space between the male connector 11 and the insertion hole of the female connector 56 is sealed without any gaps being left because the connector body 60 is formed from rubber or another such elastic material. As a result, water and other types of extraneous matter are prevented from penetrating into the connection terminals, and corrosion or faulty connections occur only very rarely. In addition, the terminal 65 of the male connector 11 is pressed against the terminal of the female connector by the elasticity of the connector body, reducing the incidence of faulty connections, noise, or the like to a very low level even when the bicycle is subjected to violent vibration or shocks.

Penetration of water and other types of extraneous matter into the connection terminals is further reduced by using the packing material 70, which seals the slit 61 that accommodates the flat cable 10, thereby reducing the incidence of corrosion or faulty connections.

Although this invention has been described in terms of certain preferred embodiments, other embodiments that are apparent to those of ordinary skill in the art are also within the scope of this invention. Accordingly, the scope of the present invention is intended to be defined only by reference to the appended claims.

What is claimed is:

1. A flat bicycle cable connector comprising:
   a connector body having a bottom surface, a top surface that includes a terminal surface, and a tip surface, the connector body having an aperture formed therein capable of allowing a flat cable to pass between the top and bottom surfaces without extending along the tip surface; and
   the cable comprising a plurality of signal wires arranged in parallel, the cable having a terminal on at least one side, the cable extending along the bottom surface, through the aperture, and along the top surface such that the terminal is positioned on the terminal surface.

2. The flat bicycle cable connector as defined in claim 1, wherein the terminal surface is generally parallel to the bottom surface, and the top surface includes an inclined section which extends generally from the aperture to the terminal surface.

3. The flat bicycle cable connector as defined in claim 1, wherein the connector body is formed from an elastic material.

4. The flat bicycle cable connector as defined in claim 3, wherein the elastic material is rubber.

5. The flat bicycle cable connector as defined in claim 1, wherein the aperture is sealed with a packing material.

6. The flat bicycle connector as defined in claim 1 in combination with a lever bracket that is adapted to be mounted to a bicycle handlebar, the lever bracket including a switch unit which includes a female connector, the female connector configured to receive and electrically connect to the cable connector.

7. The flat bicycle cable connector as defined in claim 1, wherein the connector body has a generally rectangular configuration.

8. A male cable connector for a flat cable having a plurality of conductive lines arranged in parallel, the connector comprising:

a connector body having a bottom surface, and a top surface that includes a flat terminal surface, the connector body having an aperture formed therein capable of receiving a flat cable, the aperture forming a passageway between the top and bottom surfaces; and     the flat cable comprising a terminal portion that is in electrical communication with the plurality of conductive lines, the flat cable passing through the aperture from the bottom surface to the top surface and extending to the flat terminal surface such that terminal of the flat cable are capable of establishing an electrical connection with conductors of a female connector.

9. A male cable connector for a flat cable having a plurality of conductive lines arranged in parallel, the connector comprising:

a connector body having a bottom surface, and a top surface that includes a flat terminal surface, the connector body having at least one aperture formed therein, the at least one aperture forming a passageway between the top and bottom surfaces;

the flat cable comprising a terminal portion that is in electrical communication with the plurality of conductive lines, the conductive lines passing through the at least one aperture from the bottom surface to the top surface and extending to the flat terminal surface such that terminal portion of the flat cable is capable of establishing an electrical connection with conductors of a female connector; and     the terminal surface extending generally parallel to the bottom surface, and the top surface including an inclined section that extends generally from the at least one aperture to the terminal surface.

10. The male cable connector as defined in claim 8, wherein the connector body is formed from an elastic material.

11. The male cable connector as defined in claim 10, wherein the elastic material is rubber.

12. The male cable connector as defined in claim 8, wherein the aperture is sealed with a packing material.

13. The flat bicycle connector as defined in claim 8 in combination with a lever bracket that is adapted to be mounted to a bicycle handlebar, the lever bracket including a switch unit which includes a female connector, the female connector configured to receive and electrically connect to the cable connector.

14. The male cable connector as defined in claim 8, wherein the connector body has a generally rectangular configuration.

15. The male cable connector as defined in claim 8, wherein the connector body has a tip portion which includes a tip surface and an aperture, and the aperture is spaced from the tip portion such that the flat cable passes from the bottom surface to the top surface without extending along the tip surface.

16. A method for providing a male connector for a flat cable having a plurality of conductive lines arranged in parallel, the method comprising:

providing a connector body that includes an aperture formed through the body, the aperture providing a passageway between a top surface and a bottom surface of the body; and     passing the flat cable along the bottom surface, through the aperture, and along the top surface such that terminal lines of the flat cable are positioned along the top surface and are configured to make electrical connections with a female connector.

17. The method of claim 16, wherein the top surface has a terminal surface which is generally parallel to the bottom surface, and the method further comprises passing the cable along an inclined surface which extends between the bottom surface and the terminal surface.

18. The method of claim 16, further comprising filling the aperture with a sealing material to prevent leakage.

19. The flat bicycle cable connector as defined in claim 1, wherein the aperture is elongated with a major axis being defined generally parallel to the tip surface.

20. The male cable connector as defined in claim 8, wherein the aperture is generally rectangular.

21. The male cable connector as defined in claim 15, wherein the aperture is elongated with a major axis being defined generally parallel to the tip surface.

* * * * *